(12) United States Patent
Yamamoto et al.

(10) Patent No.: US 8,774,051 B2
(45) Date of Patent: Jul. 8, 2014

(54) PATH NOTIFICATION

(75) Inventors: Toru Yamamoto, Tokyo (JP); Reiko Natsugari, Tokyo (JP)

(73) Assignee: NEC Corporation, Tokyo (JP)

(*) Notice: Subject to any disclaimer, the term of this patent is extended or adjusted under 35 U.S.C. 154(b) by 36 days.

(21) Appl. No.: 13/240,489

(22) Filed: Sep. 22, 2011

(65) Prior Publication Data

US 2012/0099585 A1 Apr. 26, 2012

(30) Foreign Application Priority Data

Oct. 26, 2010 (JP) ................................. 2010-239556

(51) Int. Cl.
*H04L 12/28* (2006.01)
*H04W 4/00* (2009.01)
*H04B 7/212* (2006.01)
*G06F 15/16* (2006.01)
*H04B 7/185* (2006.01)
*H04W 40/00* (2009.01)
*G06F 15/173* (2006.01)

(52) U.S. Cl.
USPC ........ 370/254; 370/338; 370/349; 370/395.2; 370/408; 709/203; 709/238; 709/252; 455/13.1; 455/428

(58) Field of Classification Search
USPC .............. 370/389, 350, 392, 254, 338, 349, 370/395.2, 408; 709/203, 238, 252; 455/13.1, 428
See application file for complete search history.

(56) References Cited

U.S. PATENT DOCUMENTS

| 7,539,175 B2* | 5/2009 | White et al. ................... 370/350 |
| 7,619,965 B2* | 11/2009 | Kobayashi et al. ........... 370/217 |
| 7,937,460 B2* | 5/2011 | Vaught .......................... 709/223 |
| 8,160,072 B1* | 4/2012 | Gnanasekaran et al. ...... 370/392 |
| 8,274,983 B2* | 9/2012 | Lange ....................... 370/395.21 |
| 8,369,322 B2* | 2/2013 | Ashwood Smith et al. .. 370/389 |
| 2002/0174246 A1* | 11/2002 | Tanay et al. ................... 709/238 |
| 2008/0205355 A1 | 8/2008 | Liu et al. |
| 2009/0154407 A1 | 6/2009 | Jcong et al. |
| 2010/0046435 A1 | 2/2010 | Jeon et al. |

FOREIGN PATENT DOCUMENTS

| JP | 2006-314102 A | 11/2006 |
| JP | 2008066993 A | 3/2008 |
| JP | 2008-118351 A | 5/2008 |

(Continued)

OTHER PUBLICATIONS

H. Aoki et al., "IEEE 802.11s Wireless LAN Mesh Network Technology", NTT DoCoMo Technical Journal NTT Docomo, Inc., vol. 14, No. 2, 2006, pp. 14-22.

(Continued)

*Primary Examiner* — Alpus H Hsu
*Assistant Examiner* — Anthony Luo
(74) *Attorney, Agent, or Firm* — Sughrue Mion, PLLC

(57) ABSTRACT

A server creates a communication path table indicating a communication path for packet data, based on connection information reported by a parent device and a relay device, and distributes the created communication path table to the parent device, the relay device and a child device. The child device transmits the packet data to a relay device indicated in the communication path table, based on the distributed communication path table. The relay device transfers the packet data transmitted from the child device, to a relay device or a parent device indicated in the communication path table, based on the distributed communication path table.

12 Claims, 15 Drawing Sheets

(56) References Cited

FOREIGN PATENT DOCUMENTS

| | | |
|---|---|---|
| JP | 2010-35068 A | 2/2010 |
| JP | 2010074691 A | 4/2010 |
| JP | 2010-166543 A | 7/2010 |
| JP | 2010-178348 A | 8/2010 |
| JP | 2010530175 A | 9/2010 |
| WO | 2009122903 A1 | 10/2009 |

OTHER PUBLICATIONS

The Extended European search report for EP11181555 dated Mar. 7, 2012.

Japanese Office Action for JP Application No. 2010-239556 mailed on Apr. 1, 2014 with partial English Translation.

* cited by examiner

Fig.4

| destination | transfer destination | priority | valid/invalid flag | connection permission |
|---|---|---|---|---|
| parent device 200-1 | relay device 300-6 | 1 | valid | permitted |
| parent device 200-1 | relay device 300-7 | 2 | valid | permitted |
| parent device 200-2 | relay device 300-8 | 1 | invalid | permitted |

Fig.5

| destination | transfer destination | priority | valid/invalid flag | connection permission |
|---|---|---|---|---|
| parent device 200-1 | relay device 300-1 | 1 | valid | permitted |
| parent device 200-1 | relay device 300-2 | 2 | valid | permitted |
| relay device 300-10 | relay device 300-10 | 1 | valid | permitted |
| child device 400-1 | child device 400-1 | 1 | valid | permitted |
| child device 400-3 | relay device 300-10 | 1 | valid | permitted |
| child device 400-4 | relay device 300-10 | 1 | valid | permitted |
| child device 400-5 | relay device 300-10 | 1 | valid | permitted |

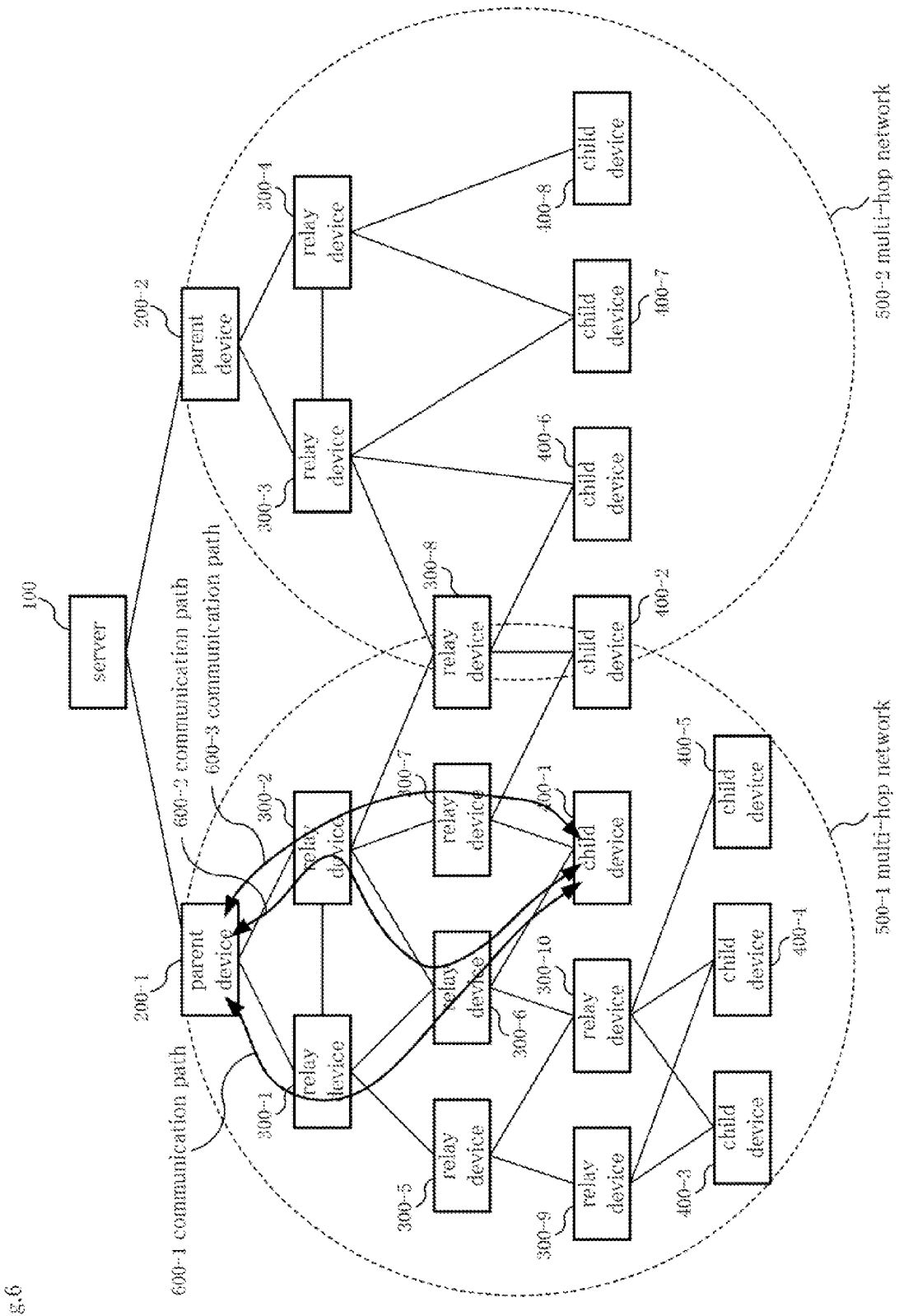

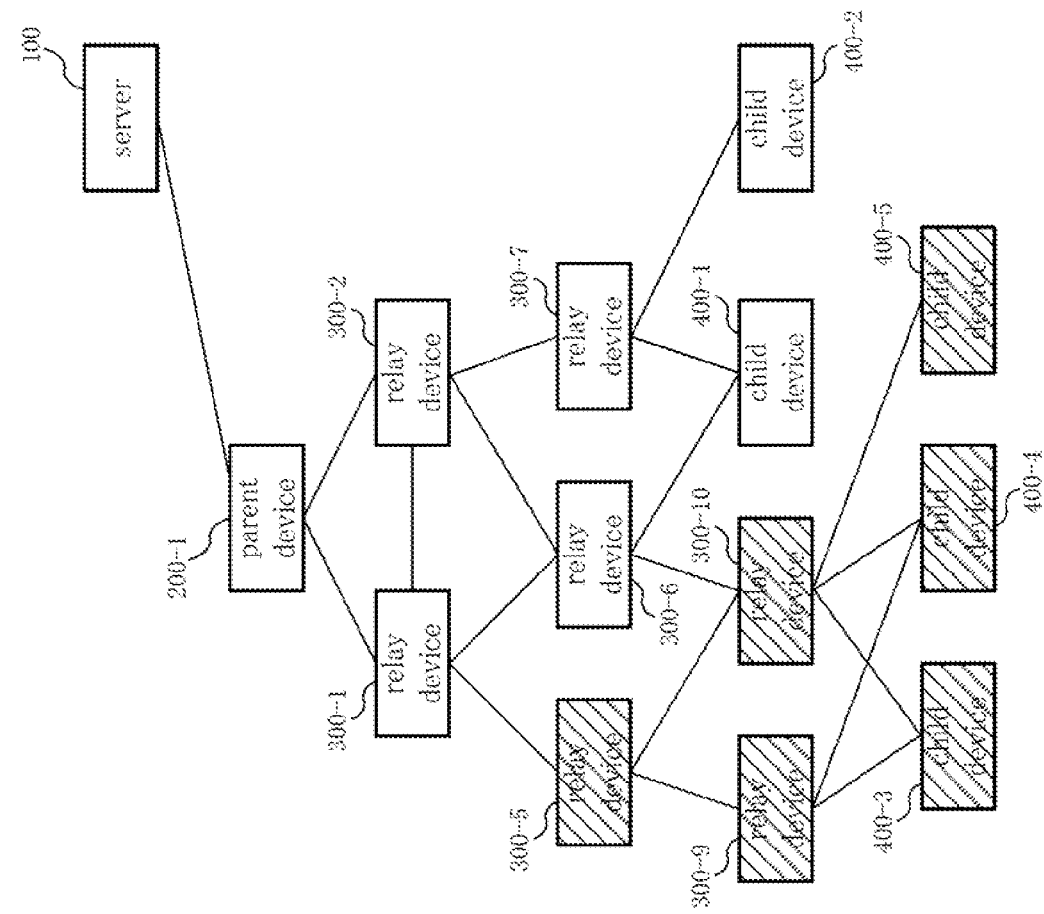

PATH NOTIFICATION

This application is based upon and claims the benefit of priority from Japanese Patent Application No. 2010-239556 filed on Oct. 26, 2010, the content of which is incorporated by reference.

BACKGROUND OF THE INVENTION

1. Field of the Invention

The present invention relates to a multi-hop network system including communication devices, a server that manages the communication devices, and a path notification method in the multi-hop network system.

2. Description of the Related Art

For mesh protocol technology in which multi-hop communication is performed via base stations to thereby attempt to enlarge a communication area, a communication scheme using a frame extension method or an extended field in standards such as IEEE 802.11s has been discussed (For example, see Hidenori Aoki, Shinji Takeda, Kengo Yagyuu, Akira Yamada, "IEEE 802.11s Wireless LAN Mesh Network Technology", NTT DoCoMo Technical Journal, NTT DOCOMO, INC., Jul. 1, 2006, Vol. 14, No. 2, p. 14-22).

Moreover, there has been known a multi-hop network (or an ad-hoc network or an MANET (Mobile Ad-hoc Network)) used in a multi-hop communication scheme that enables packet transmission in a bucket brigade fashion by multi-hopping packet data among communication devices. For a routing protocol (a path selection/control protocol) used in this multi-hop network, routing schemes have been proposed/published in MANET working group of IETF (Internet Engineering Task Force) or IEEE 802.11s, and standardization thereof has progressed.

However, the above described techniques include the following problems.

As a first problem, in the multi-hop network, the larger the scale of the network, the higher is the performance that is required of the communication devices belonging to this network. Communication traffic increases along with an increase in the number of control packets transmitted and received in the entire network for routing control or the like, and an increase in the number of the communication devices. Thereby, congestion and transmission delay increase. Moreover, power consumption in the entire network also increases. This is due to the following reasons.

In the multi-hop network, it is necessary to create a communication path table indicating a routing path through which the packet data reaches a final destination. In order to create this communication path table, in a general routing protocol, the communication device first transmits a broadcast packet for path search. When receiving the transmitted broadcast packet, the communication device retransmits this broadcast packet in order to expand a path search range. In this way, a target packet transfer destination is found and a communication path table is created by propagating the broadcast packet for the path search, throughout the network.

In this way, in a large-scale network, according to the propagation of the broadcast packet throughout the network, the amount of packets transmitted for the path search increases, and a congestion and the transmission delay occurs in the network along with an increase in the number of transmitted and received packets.

Moreover, path information obtained by each communication device needs to be retained and updated.

Furthermore, a communication device with a low calculation capability includes a limited relay capability for the broadcast packet for path retrieval, or a limited relay capability for the transmitted packet. Thus, this limited relay capability may cause a transmission delay, or may decrease throughput of the entire network.

Due to these reasons, high calculation performance and abundant resources are required for the communication devices belonging to the large-scale multi-hop network. If each communication device performs processing depending on the requirement, power consumption in each communication device increases, which causes power consumption in the entire network to increase as well.

Moreover, now, proposed routing protocols include, as schemes applicable to the multi-hop network, schemes such as an AODV (Ad-hoc On Demand Distance Vector) protocol and an OLSR (Optimized Link State Routing), which have been discussed in MANET (Mobile Ad-hoc Network)-WG (Working Group). As a second problem, all of these schemes have to update the path information by periodical path check. This is due to the following reason.

In these protocols, it is assumed that the communication device moves and is powered OFF/ON, and thus periodical update of the path information is essential. This is because, when the communication device moves, the same ID (Identification) (for example, an MAC [Media Access Control] address) exists in locations, and thus routing cannot be performed.

As a third problem, in the multi-hop network, when the number of hops increases, that is, when the number of the communication devices to be passed through (the number of relay nodes) increases, communication quality degrades, and quality degradation such as a decrease in throughput occurs.

The reason is as follows. Since the number of times of transmission and reception of the packets increases along with an increase in the number of the relay nodes, the probability of packet discard increases. Also, transfer delay of the packet data increases due to process delay for the number of the relay nodes. Thus, in a protocol such as TCP (Transmission Control Protocol)/IP (Internet Protocol), a response confirmation time increases to decrease the throughput.

SUMMARY OF THE INVENTION

An object of the present invention is to provide a multi-hop network system, a server and a path notification method that solve the above described problems.

A multi-hop network system of the present invention is:

a multi-hop network system for performing multi-hop communication, the system including:

a parent device that is connected to a highest level of said multi-hop network system;

a child device that is connected to an end of said multi-hop network system;

a relay device that transfers packet data transmitted from said child device to said parent device; and a server that creates a communication path table indicating a communication path for the packet data, based on connection information reported by said parent device and said relay device, and distributes the created communication path table to said parent device, said relay device and said child device, wherein said parent device reports the connection information to said server, said child device transmits the packet data to a relay device indicated in the communication path table, based on the communication path table distributed by said server, and said relay device reports the connection information to said server, and transfers the packet data transmitted from said child device, to a relay device or a parent device indicated in the communication path table, based on the communication path table distributed by said server.

Moreover, a server of the present invention includes:

a path table creator that creates a communication path table indicating a communication path for packet data to be transmitted and received by communication devices included in a multi-hop network system that performs multi-hop communication, based on connection information reported by said communication devices; and a path table distributor that distributes the communication path table created by said path table creator, to said communication devices.

Moreover, a path notification method of the present invention is:

a path notification method of notifying a communication path through which packet data is transmitted from a child device connected to an end of a multi-hop network system, to a parent device connected to a highest level of said multi-hop network system, via a relay device, the method including the processes of:

reporting connection information on said parent device to a server connected to said parent device, by said parent device;

reporting connection information on said relay device to said server by said relay device;

creating a communication path table indicating the communication path for the packet data, by said server, based on the connection information reported by said parent device and said relay device;

distributing the created communication path table to said parent device, said relay device and said child device by said server;

transmitting the packet data to a relay device indicated in the communication path table, by said child device, based on the communication path table distributed by said server; and transferring the packet data transmitted from said child device, to a relay device or a parent device indicated in the communication path table, by said relay device, based on the communication path table distributed by said server.

As described above, in the present invention, it is possible to attempt to reduce network loads due to a communication path notification process.

The above and other objects, features, and advantages of the present invention will become apparent from the following description with reference to the accompanying drawings which illustrate an example of the present invention.

BRIEF DESCRIPTION OF THE DRAWINGS

FIG. 4 is a diagram showing an example of a communication path table stored in a path table storage included in a child device shown in FIG. 1;

FIG. 5 is a diagram showing an example of a communication path table stored in a path table storage included in the relay device shown in FIG. 1;

FIG. 6 is a diagram showing a communication path for packet data to be transmitted from the child device to a parent device in a case where the communication path tables as shown in FIGS. 4 and 5 are stored in the path table storages;

FIG. 15 is a diagram showing another example of the virtual multi-hop network configured on the physical multi-hop network shown in FIG. 13.

DETAILED DESCRIPTION OF THE PREFERRED EMBODIMENTS

Exemplary embodiments will be described below with reference to the drawings. Note that a basic concept, basic operations and a basic configuration of a multi-hop network have already been known to those skilled in the art, and thus detailed descriptions thereof are herein omitted.

Figure 1:
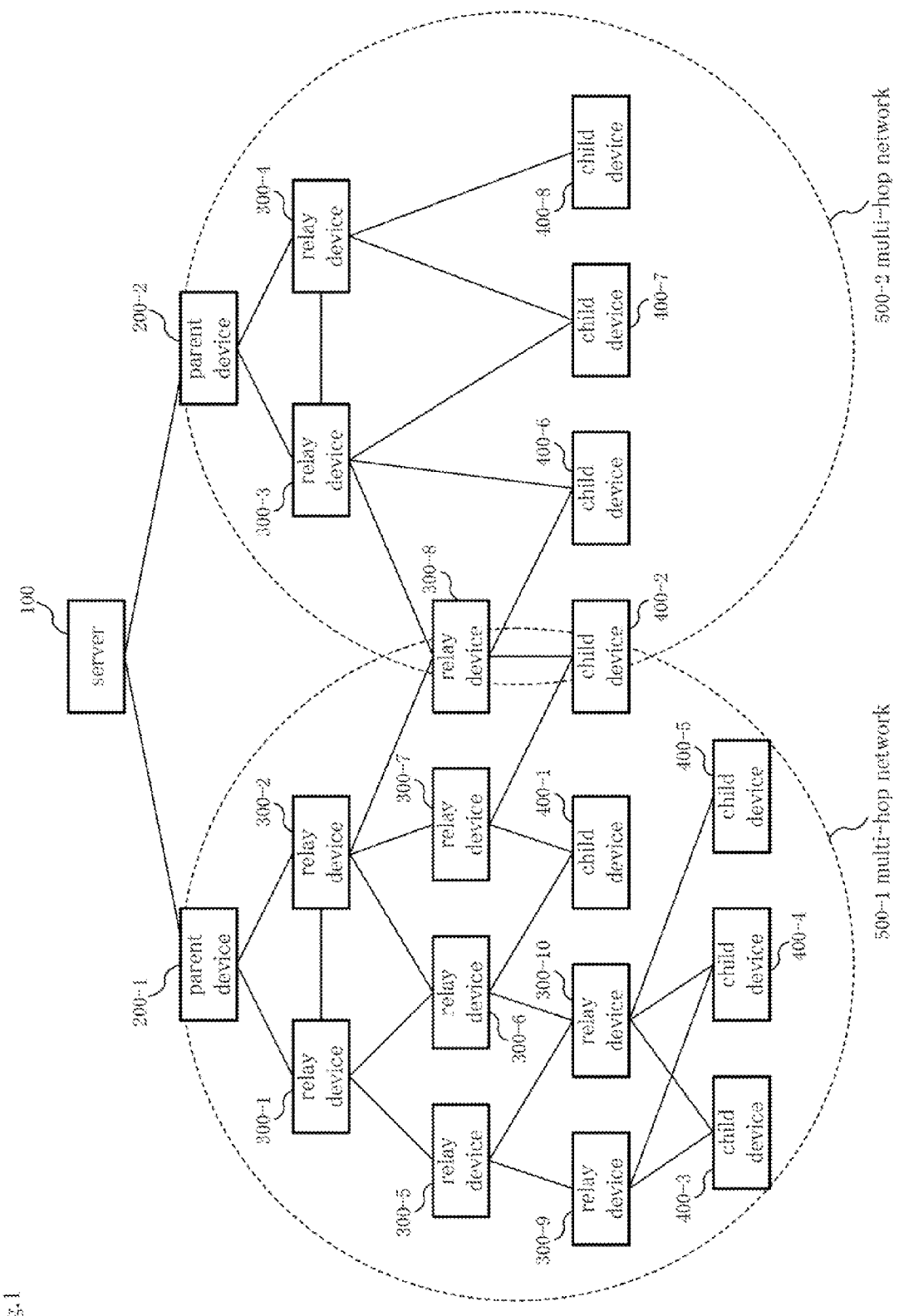
FIG. 1 is a diagram showing an exemplary embodiment of a multi-hop network system.

With reference to FIG. 1, a multi-hop network system including server 100, parent devices 200-1 and 200-2, relay devices 300-1 to 300-10, and child devices 400-1 to 400-8 is disclosed.

Parent devices 200-1 and 200-2, relay devices 300-1 to 300-10 and child devices 400-1 to 400-8 are communication devices that transmit and receive packet data. Note that wireless communication or wired communication may be used for communication thereof.

Moreover, relay devices 300-1 to 300-10 and child devices 400-1 to 400-8 include functions equivalent to one another, and only differ in whether or not a relay (transfer) operation is performed. Note that relay devices 300-1 to 300-10 and child devices 400-1 to 400-8 may include functions different from one another.

Moreover, parent device 200-1, relay devices 300-1, 300-2 and 300-5 to 300-10, and child devices 400-1 to 400-5 are included in multi-hop network 500-1 that performs multi-hop communication.

Moreover, parent device 200-2, relay devices 300-3, 300-4 and 300-8, and child devices 400-2 and 400-6 to 400-8 are included in multi-hop network 500-2 that performs the multi-hop communication.

Moreover, relay device 300-8 and child device 400-2 belong to both multi-hop network 500-1 and multi-hop network 500-2.

Moreover, server 100 is connected to parent devices 200-1 and 200-2.

Moreover, parent device 200-1 is connected to relay devices 300-1 and 300-2.

Moreover, parent device 200-2 is connected to relay devices 300-3 and 300-4.

Moreover, relay device 300-1 is connected to relay devices 300-2, 300-5 and 300-6, in addition to parent device 200-1.

Moreover, relay device 300-2 is connected to relay devices 300-6 to 300-8, in addition to parent device 200-1 and relay device 300-1.

Moreover, relay device 300-3 is connected to relay devices 300-4 and 300-8, and child devices 400-6 and 400-7, in addition to parent device 200-2.

Moreover, relay device 300-4 is connected to child devices 400-7 and 400-8, in addition to parent device 200-2 and relay device 300-3.

Moreover, relay device 300-5 is connected to relay devices 300-9 and 300-10, in addition to relay device 300-1.

Moreover, relay device 300-6 is connected to relay device 300-10 and child device 400-1, in addition to relay devices 300-1 and 300-2.

Moreover, relay device 300-7 is connected to child devices 400-1 and 400-2, in addition to relay device 300-2.

Moreover, relay device 300-8 is connected to child devices 400-2 and 400-6, in addition to relay devices 300-2 and 300-3.

Moreover, relay device 300-9 is connected to child devices 400-3 and 400-4, in addition to relay device 300-5.

Moreover, relay device 300-10 is connected to child devices 400-3 to 400-5, in addition to relay devices 300-5 and 300-6.

Note that FIG. 1 shows a network in which server 100, parent devices 200-1 and 200-2, relay devices 300-1 to 300-10, and child devices 400-1 to 400-8 are connected in a tree structure. The network only needs to logically include network topology in which parent devices 200-1 and 200-2 are located on top (a highest level), and moreover, child devices 400-1 to 400-8 are located at ends, and relay devices 300-1 to 300-10 transfer (relay) the packet data transmitted from child devices 400-1 to 400-8 to parent devices 200-1 and 200-2. Thus, the network is not limited to a physical connection as shown in FIG. 1.

Server 100 creates or updates a communication path table indicating a communication path for the packet data, based on connection information reported by parent devices 200-1 and 200-2, and relay devices 300-1 to 300-10. Moreover, server 100 distributes the created or updated communication path table to parent devices 200-1 and 200-2, relay devices 300-1 to 300-10, and child devices 400-1 to 400-8.

Moreover, in the creation of the communication path table, for example, when the packet data is transmitted from child device 400-3 to parent device 200-1, if there are communication paths such as a communication path via relay devices 300-9, 300-5 and 300-1 and a communication path via relay devices 300-10, 300-6 and 300-2, server 100 creates the communication path table indicating the communication paths.

Moreover, in the creation of the communication path table, server 100 creates the communication path table including a transmission timing when each of parent devices 200-1 and 200-2, relay devices 300-1 to 300-10, and child devices 400-1 to 400-8 transmits the packet data. This transmission timing will be described in detail later.

Moreover, in the creation of the communication path table, if reception quality information indicating reception quality of the packet data in each device is transmitted from parent devices 200-1 and 200-2, and relay devices 300-1 to 300-10, server 100 assigns a priority to the communication path, based on the reception quality indicated by the reception quality information, and creates the communication path table including priority information indicating the priority. Specifically, server 100 assigns a low priority to a path with poor reception quality (for example, when its electric field intensity is weaker than a predetermined threshold, or the like), and moreover, assigns a high priority to a path with good reception quality (for example, when its error rate is lower than a predetermined threshold, or the like).

Each of parent devices 200-1 and 200-2 reports the connection information that is information indicating the relay devices connected to each of parent devices 200-1 and 200-2, to server 100.

Each of relay devices 300-1 to 300-10 reports the connection information that is information indicating the relay device and the child device connected to each of relay devices 300-1 to 300-10, to server 100. Moreover, each of relay devices 300-1 to 300-10 transfers the packet data transmitted from the child device, to the relay device or the parent device indicated in the communication path table, based on the communication path table distributed by server 100.

Moreover, each of relay devices 300-1 to 300-10 transfers the packet data at a timing depending on the transmission timing indicated in the communication path table distributed by server 100.

Moreover, when there is a new connection of the relay device or the child device, other than the relay device and the child device that are connected to each of relay devices 300-1 to 300-10, each of relay devices 300-1 to 300-10 reports the connection information indicating this connection, to server 100.

Moreover, if communication through all the communication paths indicated in the communication path table is disabled, each of relay devices 300-1 to 300-10 uses an autonomous routing function to continue the communication, and reports the connection information obtained by using the autonomous routing function, to server 100.

Moreover, each of relay devices 300-1 to 300-10 transfers the packet data based on the priority indicated by the priority information indicated in the communication path table distributed by server 100.

Moreover, each of child devices 400-1 to 400-8 transmits the packet data to the relay device indicated in the communication path table, based on the communication path table distributed by server 100.

Moreover, each of child devices 400-1 to 400-8 transmits the packet data at a timing depending on the transmission timing indicated in the communication path table distributed by server 100.

Moreover, each of child devices 400-1 to 400-8 transmits the packet data based on the priority indicated by the priority information indicated in the communication path table distributed by server 100.

Figure 2:
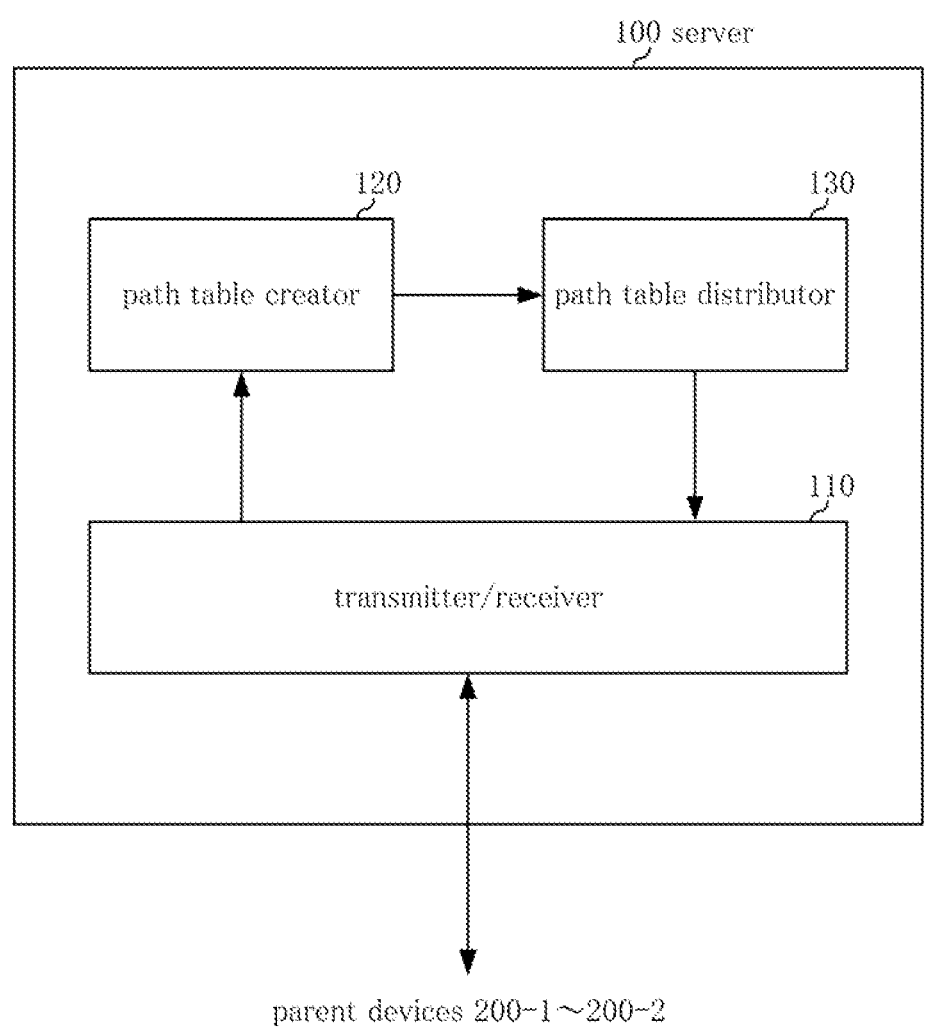
FIG. 2 is a diagram showing an example of an internal configuration of a server shown in FIG. 1.

Server 100 shown in FIG. 1 includes transmitter/receiver 110, path table creator 120, and path table distributor 130, as shown in FIG. 2. Note that FIG. 2 shows only components related to the present invention, in components included in server 100 shown in FIG. 1.

Transmitter/receiver 110 transmits the packet data to and receives the packet data from parent devices 200-1 and 200-2.

Path table creator 120 creates the communication path table indicating the communication paths for the packet data transmitted from child devices 400-1 to 400-8 to parent devices 200-1 and 200-2, based on the connection information reported by parent devices 200-1 and 200-2, and by relay devices 300-1 to 300-10.

Path table distributor 130 distributes the communication path table created by path table creator 120, via transmitter/receiver 110, to parent devices 200-1 and 200-2, relay devices 300-1 to 300-10, and child devices 400-1 to 400-8.

Figure 3:
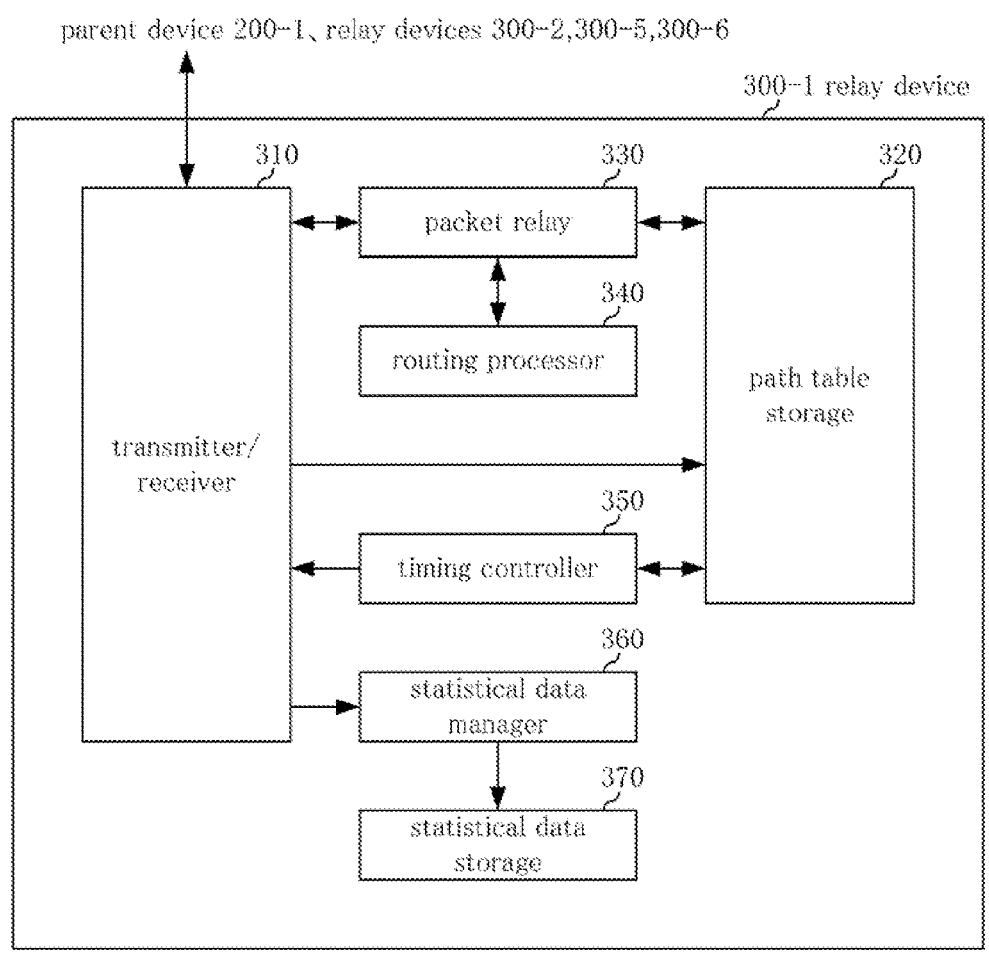
FIG. 3 is a diagram showing an example of an internal configuration of a relay device shown in FIG. 1.

Relay device 300-1 shown in FIG. 1 includes transmitter/receiver 310, path table storage 320, packet relay 330, routing processor 340, timing controller 350, statistical data manager 360, and statistical data storage 370, as shown in FIG. 3. Note that FIG. 3 shows only components related to the present invention, in components included in relay device 300-1 shown in FIG. 1. Moreover, internal configurations of relay devices 300-2 to 300-10 and child devices 400-1 to 400-8 are also the same as an internal configuration of relay device 300-1.

Transmitter/receiver 310 transmits the packet data to and receives the packet data from parent device 200-1 and relay devices 300-2, 300-5 and 300-6 that are connected to relay device 300-1.

Path table storage 320 stores the communication path table distributed by server 100 via parent device 200-1. A specific communication path table stored in path table storage 320 will be described later.

Packet relay 330 relays (transfers) packet data that has been transmitted from the child device via the relay device and is destined for parent device 200-1, via transmitter/receiver 310. At this time, packet relay 330 refers to a destination of the transmitted packet data. Then, as a result of the reference, if this packet data is not packet data destined for relay device 300-1, packet relay 330 transfers this packet data to the parent device or the relay device indicated in the communication path table, with reference to the communication path table stored in path table storage 320.

Routing processor 340 determine validity of the communication path table stored in path table storage 320. If the communication paths are stored in path table storage 320, routing processor 340 determines the communication path to be used, based on whether each communication path is valid or invalid, and on the priority of each communication path. Moreover, if no valid communication path is stored in path table storage 320, routing processor 340 performs autonomous routing, retrieves a valid communication path, and adds and stores the communication path found (obtained) through the retrieval, into path table storage 320. Moreover, routing processor 340 reports the obtained communication path as the connection information, to server 100 via transmitter/receiver 310.

Moreover, if the valid communication path is stored in path table storage 320, routing processor 340 performs packet transfer to a transfer destination having highest priority, according to the priority stored for each destination. Moreover, if the packet transfer to the transfer destination having highest priority has failed, routing processor 340 sets a corresponding valid/invalid flag stored in path table storage 320, to be invalid. Thereby, the received packet is transferred to a transfer destination that has the next highest priority.

Timing controller 350 controls the timing when the packet data is transmitted, based on the transmission timing included in the communication path table stored in path table storage 320.

Statistical data manager 360 collects reception information on all the packet data received by transmitter/receiver 310. A purpose of collecting the reception information is to perform stable communication. The reception information to be collected includes, for example, transmitter information on the received packet data, and reception quality information such as reception electric field intensity of the received packet data, an error rate of the received packet data, and transmission path delay of the received packet data. Statistical data manager 360 writes the reception quality information from the collected reception information, for each transmitter into statistical data storage 370. Moreover, statistical data manager 360 periodically reads the reception quality information stored in statistical data storage 370, and reports (transmits) the reception quality information to server 100.

Statistical data storage 370 stores the reception information written by statistical data manager 360, in a table format.

Hereinafter, two examples of the communication path table stored in path table storage 320 will be described.

In the path table storage included in child device 400-1 shown in FIG. 1, the destination of the packet data to be transmitted, the transfer destination (the transmission destination in directly connected devices) to which this packet data is transferred, the priority indicating priority of the transmission of this packet data (here, a higher priority includes a smaller numerical value), the valid/invalid flag indicating whether the communication path is valid or invalid, and connection permission indicating whether or not the connection is permitted are stored for association with one another, as shown in FIG. 4. This connection permission indicates "permitted" or "prohibited". In a case where the connection permission indicates "prohibited", even if all other paths become unavailable, the connection cannot be used. Moreover, the valid/invalid flag and the connection permission may be represented by 1-bit data. For example, the valid/invalid flag of "1" may represent "valid", and the valid/invalid flag of "0" may represent "invalid".

For example, as shown in FIG. 4, the destination "parent device 200-1", the transfer destination "relay device 300-6", the priority "1", the valid/invalid flag "valid", and the connection permission "permitted" are associated with one another. This indicates that a communication path through which the packet data that is to be transmitted to parent device 200-1 is transferred to relay device 300-6 is valid, and includes the high priority, and its connection is permitted. Moreover, the destination "parent device 200-1", the transfer destination "relay device 300-7", the priority "2", the valid/invalid flag "valid", and the connection permission "permitted" are associated with one another. This indicates that a communication path through which the packet data that is to be transmitted to parent device 200-1 is transferred to relay device 300-7 is valid, and includes the low priority, and its connection is permitted. Moreover, the destination "parent device 200-2", the transfer destination "relay device 300-8", the priority "1", the valid/invalid flag "invalid", and the connection permission "permitted" are associated with one another. This indicates that a communication path through which the packet data that is to be transmitted to parent device 200-2 is transferred to relay device 300-8 includes the high priority, and its connection is permitted, while this communication path is invalid.

In the path table storage included in relay device 300-6 shown in FIG. 1, similar to the communication path table stored in the path table storage included in child device 400-1 as shown in FIG. 4, the destination of the packet data that is to be transmitted, the transfer destination (the transmission destination in directly connected devices) to which this packet data is transferred, the priority indicating the priority of the transmission of this packet data (here, the higher priority includes the smaller numerical value), the valid/invalid flag indicating whether the communication path is valid or invalid, and the connection permission indicating whether or not the connection is permitted are stored for association with one another, as shown in FIG. 5.

For example, as shown in FIG. 5, the destination "parent device 200-1", the transfer destination "relay device 300-1", the priority "1", the valid/invalid flag "valid", and the connection permission "permitted" are associated with one another. This indicates that a communication path through which the packet data that is to be transmitted to parent device 200-1 is transferred to relay device 300-1 is valid, and includes the high priority, and its connection is permitted.

Moreover, the destination "parent device 200-1", the transfer destination "relay device 300-2", the priority "2", the valid/invalid flag "valid", and the connection permission "permitted" are associated with one another. This indicates that a communication path through which the packet data that is to be transmitted to parent device 200-1 is transferred to relay device 300-2 is valid, and includes the low priority, and its connection is permitted.

Moreover, the destination "relay device 300-10", the transfer destination "relay device 300-10", the priority "1", the valid/invalid flag "valid", and the connection permission "permitted" are associated with one another. If the packet data is transmitted to relay device 300-10, since relay device 300-10 is directly connected to relay device 300-6, this indicates that its transfer destination is relay device 300-10, its communication path is valid, its priority is high, and its connection is permitted.

Moreover, the destination "child device 400-1", the transfer destination "child device 400-1", the priority "1", the valid/invalid flag "valid", and the connection permission "permitted" are associated with one another. If the packet data is transmitted to child device 400-1, since child device 400-1 is directly connected to relay device 300-6, this indicates that its transfer destination is child device 400-1, its communication path is valid, its priority is high, and its connection is permitted.

Moreover, the destination "child device 400-3", the transfer destination "relay device 300-10", the priority "1", the valid/invalid flag "valid", and the connection permission "permitted" are associated with one another. This indicates that a communication path through which the packet data that is to be transmitted to child device 400-3 is transferred to relay device 300-10 is valid, and includes the high priority, and its connection is permitted.

Moreover, the destination "child device 400-4", the transfer destination "relay device 300-10", the priority "1", the valid/invalid flag "valid", and the connection permission "permitted" are associated with one another. This indicates that a communication path through which the packet data that is to be transmitted to child device 400-4 is transferred to relay device 300-10 is valid, and includes the high priority, and its connection is permitted.

Moreover, the destination "child device 400-5", the transfer destination "relay device 300-10", the priority "1", the valid/invalid flag "valid", and the connection permission "permitted" are associated with one another. This indicates that a communication path through which the packet data that is to be transmitted to child device 400-5 is transferred to relay device 300-10 is valid, and includes the high priority, and its connection is permitted.

In this way, not only the communication path for the packet data that is to be transmitted from the child device to the parent device, but also the communication path for the packet data that is to be transmitted from the parent device to the child device are previously stored. Thereby, the communication path from the parent device to the child device can also be controlled.

If the communication path tables as shown in FIGS. 4 and 5 are stored in the path table storages, communication paths 600-1 and 600-2 for the packet data that is to be transmitted from child device 400-1 to parent device 200-1 are respectively as follows, as shown in FIG. 6:

(1) child device 400-1→relay device 300-6→relay device 300-1→parent device 200-1; and
(2) child device 400-1→relay device 300-6→relay device 300-2→parent device 200-1.

Moreover, if a communication path in which the transfer destination of the packet data that is to be transmitted from child device 400-1 to parent device 200-1 is relay device 300-2 is stored in the path table storage of relay device 300-7, (3) child device 400-1→relay device 300-7→relay device 300-2→parent device 200-1 also becomes communication path 600-3.

Note that, in the above described example, an example has been described in which the packet data is transmitted from child devices 400-1 to 400-8, to parent devices 200-1 and 200-2. Needless to say, a similar process is also possible if the packet data is transmitted from parent devices 200-1 and 200-2 to child devices 400-1 to 400-8.

Hereinafter, the distribution of the communication path table will be described with reference to FIG. 7.

Figure 7:
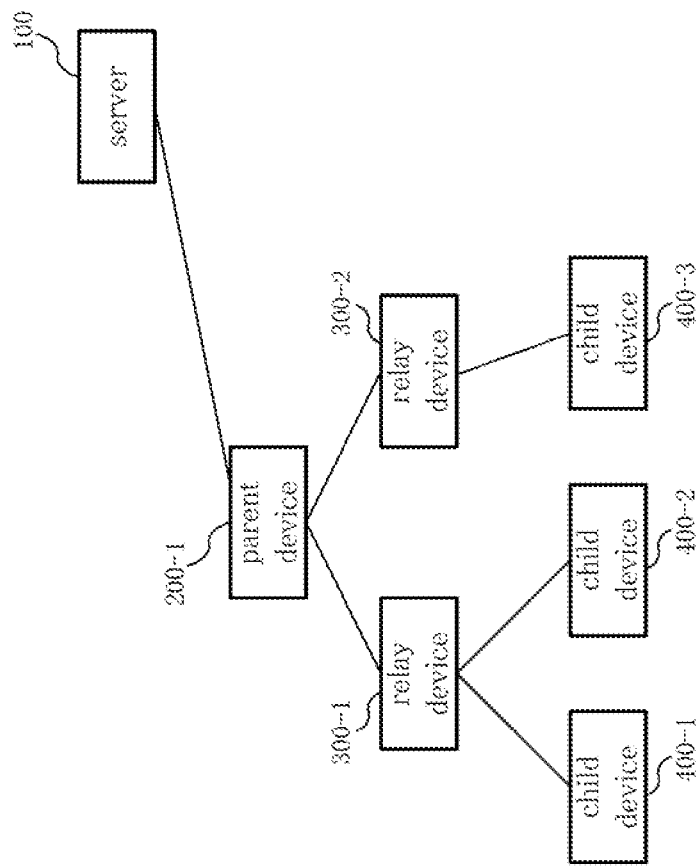
FIG. 7 is a diagram showing an example of a multi-hop network connection form provided by simplifying a form shown in FIG. 1, in order to describe a process for distributing the communication path table.

In a multi-hop network including server 100, parent device 200-1, relay devices 300-1 and 300-2, and child devices 400-1 to 400-3 as shown in FIG. 7, a process of the distribution of the communication path table will be described.

Figure 8:
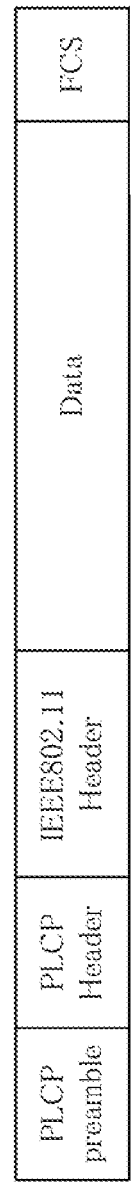
FIG. 8 is a diagram showing a format of general packet data used in standards of IEEE 802.11.

General packet data used in standards of IEEE 802.11 includes respective fields of a PLDP (Physical Layer Convergence Protocol) preamble, a PLCP header, an IEEE 802.11 header, a data portion, and an FCS (Frame Check Sequence) portion, as shown in FIG. 8. The respective fields are generally used, and thus descriptions thereof are herein omitted. Moreover, schemes of a PHY layer and an MAC layer are not questioned in the present invention.

Figure 9:
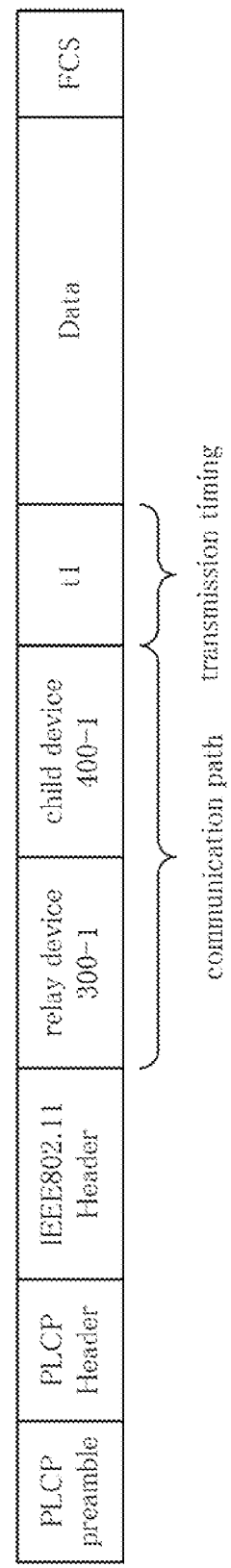
FIG. 9 is a diagram showing an example of a configuration of the packet data including the communication path table to be distributed by the server shown in FIG. 7, via the parent device to the relay device and the child device.

In a configuration of the packet data including the communication path table that is distributed by server 100 shown in FIG. 7 via parent device 200-1 to relay device 300-1 and child device 400-1, the communication path (communication path table) and the transmission timing are inserted between the IEEE 802.11 header and the data portion, as shown in FIG. 9.

In an example shown in FIG. 9, relay device 300-1 and child device 400-1 are indicated as the communication path. This indicates that the communication path for the packet data that is to be transmitted from child device 400-1 to parent device 200-1 is:

child device 400-1→relay device 300-1→parent device 200-1.

Moreover, it is indicated that the transmission timing (transmission time) when child device 400-1 transmits the packet data is "t1".

When the packet data including the communication path table shown in FIG. 9 is transmitted from server 100 via parent device 200-1 to relay device 300-1, this packet data is edited in relay device 300-1.

Figure 10:
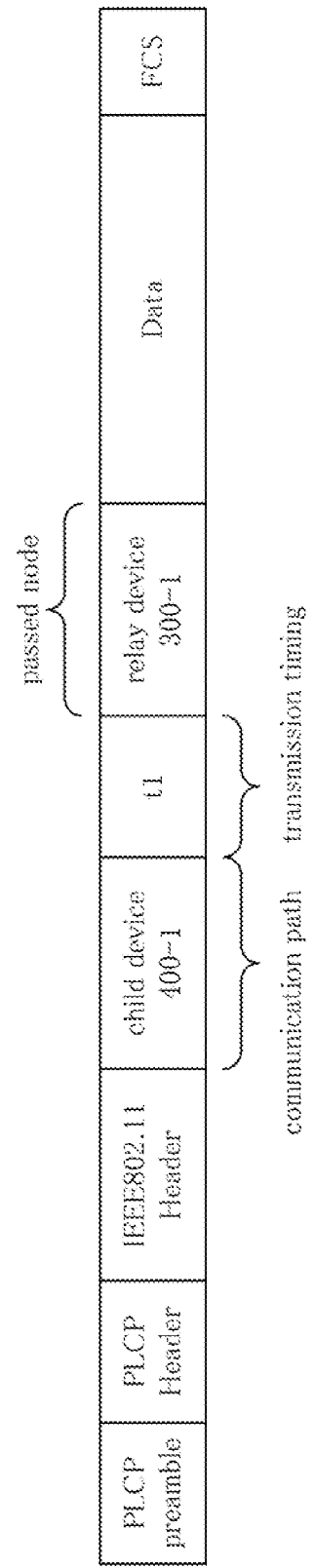
FIG. 10 is a diagram showing an example of the configuration of the packet data edited in the relay device.

As shown in FIG. 10, when the packet data edited in relay device 300-1 is edited, information indicating relay device 300-1 is set as information indicating a passed node, in the communication path table included in the packet data transmitted to relay device 300-1. In other words, if it is recognized in relay device 300-1 that relay device 300-1 is set as the communication path, relay device 300-1 may be recognized as the passed node in child device 400-1.

Moreover, the edited packet data is transmitted from relay device 300-1 to child device 400-1. Then, child device 400-1 confirms that child device 400-1 is not included in the passed node, and transmits the packet data. At this time, child device 400-1 retains the transmission timing t1, and transmits the packet data destined for parent device 200-1, to relay device 300-1 when the time becomes t1.

Hereinafter, the transmission timing of the packet data will be described with reference to FIG. 11.

Figure 11:
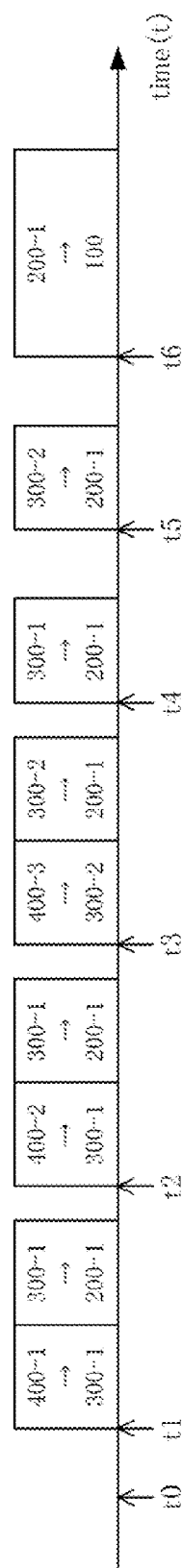
FIG. 11 is a diagram showing a situation of the transmission of the packet data depending on transmission timing.

In FIG. 11, "t0" is a transmission reference time. Moreover, t1 to t6 have been previously set, and included in the communication path table to be distributed.

Here, a case where the following transmission timings are indicated in the communication path table to be distributed will be described by way of example.

It is indicated in the communication path table to be distributed to child device 400-1 and relay device 300-1, that the transmission timing from child device 400-1, of the packet data to be transmitted from child device 400-1 via relay device 300-1 to parent device 200-1, is "t1". Moreover, it is indicated in the communication path table to be distributed to child device 400-2 and relay device 300-1, that the transmission timing from child device 400-2, of the packet data to be transmitted from child device 400-2 via relay device 300-1 to parent device 200-1, is "t2". Moreover, it is indicated in the communication path table to be distributed to child device 400-3 and relay device 300-2, that the transmission timing from child device 400-3, of the packet data to be transmitted from child device 400-3 via relay device 300-2 to parent device 200-1, is "t3". Moreover, it is indicated in the communication path table to be distributed to relay device 300-1, that the transmission timing from relay device 300-1, of the packet data to be transmitted from relay device 300-1 to parent device 200-1, is "t4". Moreover, it is indicated in the communication path table to be distributed to relay device 300-2, that the transmission timing from relay device 300-2, of the packet data to be transmitted from relay device 300-2 to parent device 200-1, is "t5". Moreover, it is indicated in the communication path table to be distributed to parent device 200-1, that the transmission timing from parent device 200-1, of the packet data to be transmitted from parent device 200-1 to server 100, is "t6".

As shown in FIG. 11, at time "t1", the packet data is transmitted from child device 400-1 to relay device 300-1. Subsequently, when receiving the packet data, relay device 300-1 transmits this packet data to parent device 200-1, without waiting.

Moreover, at time "t2", the packet data is transmitted from child device 400-2 to relay device 300-1. Subsequently, when receiving the packet data, relay device 300-1 transmits this packet data to parent device 200-1, without waiting.

Moreover, at time "t3", the packet data is transmitted from child device 400-3 to relay device 300-2. Subsequently, when receiving the packet data, relay device 300-2 transmits this packet data to parent device 200-1, without waiting.

Moreover, at time "t4", the packet data is transmitted from relay device 300-1 to parent device 200-1.

Moreover, at time "t5", the packet data is transmitted from relay device 300-2 to parent device 200-1.

Moreover, at time "t6", the packet data is transmitted from parent device 200-1 to server 100. This packet data transmitted by parent device 200-1 is provided by editing the packet data transmitted from child devices 400-1 to 400-3 and relay devices 300-1 and 300-2.

In this way, since packet transmission timings that are different from one another are assigned to the child device, the relay device and the parent device, respectively, packet collision is avoided in the multi-hop network. Server 100 determines each packet transmission timing taking into consideration the network topology, in the creation of the communication path table.

Moreover, since transmission timing information is not assigned to a device that newly belongs to the multi-hop network, a possibility of the packet collision may occur. Thus, collision-avoidance means with carrier sense that is generally used in a wireless LAN (Local Area Network) or the like is also simultaneously used. The above described collision-avoidance mechanism is a realization method in a layer higher than the MAC layer and the PHY layer in each wireless scheme, and can be simultaneously used with a collision-avoidance mechanism in the MAC layer and the PHY layer in each wireless scheme.

Hereinafter, a path notification method in this form will be described with reference to FIG. 12.

Figure 12:
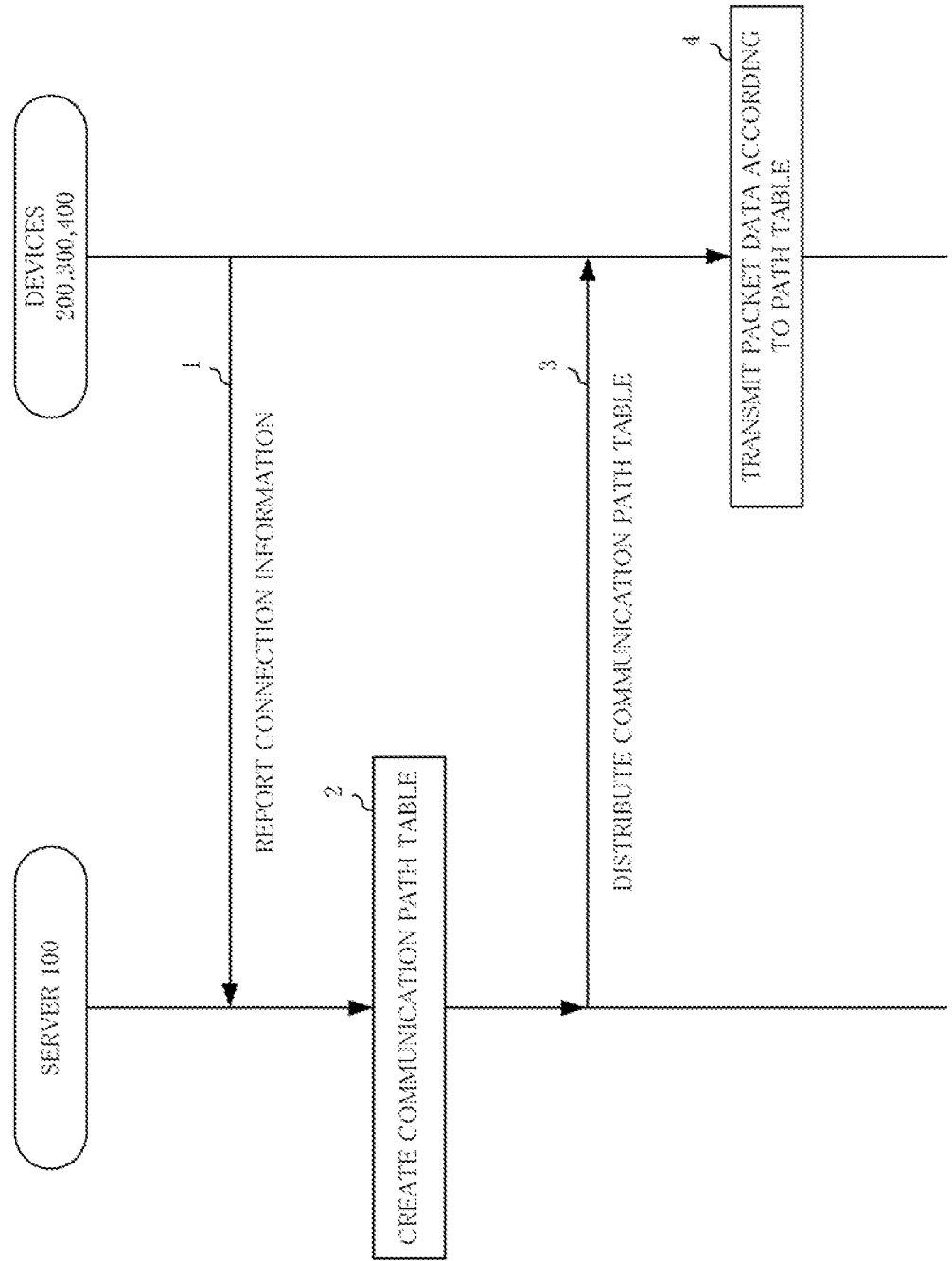
FIG. 12 is a sequence diagram for describing a path notification method in this form.

In FIG. 12 and the following description, devices 200, 300 and 400 denote parent devices 200-1 and 200-2, relay devices 300-1 to 300-10, and child devices 400-1 to 400-8.

First, when the connection information is reported to server 100 from devices 200, 300 and 400 in step 1, the communication path table is created by path table creator 120 of server 100 based on this connection information, in step 2.

Then, the communication path table created in path table creator 120 is distributed by path table distributor 130 of server 100 via transmitter/receiver 110 to devices 200, 300 and 400, in step 3.

Subsequently, according to the distributed communication path table, the packet data is transmitted from devices 200, 300 and 400, in step 4.

Next, a virtual multi-hop network configured on a physical multi-hop network will be described.

Figure 13:
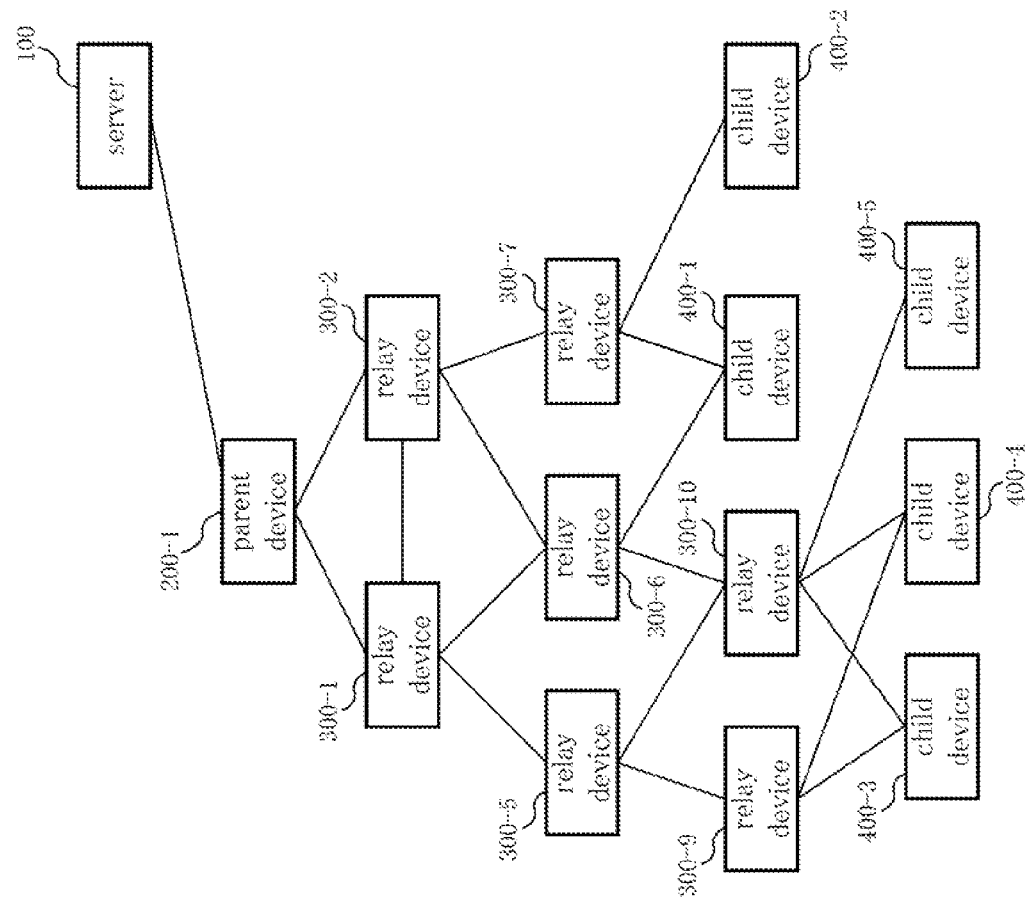
FIG. 13 is a diagram showing an example of a physical multi-hop network.
Figure 14:
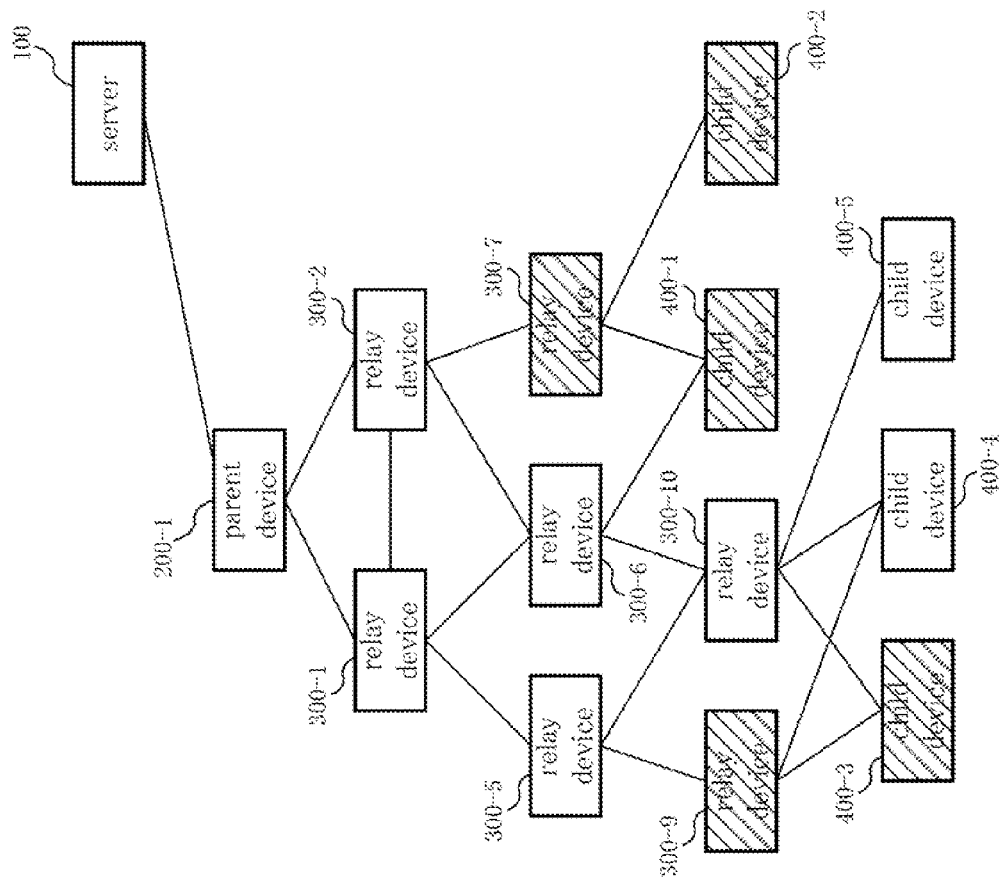
FIG. 14 is a diagram showing an example of a virtual multi-hop network configured on the physical multi-hop network shown in FIG. 13.

As shown in FIG. 14, for a physical multi-hop network shown in FIG. 13, relay devices 300-7 and 300-9, and child devices 400-1 to 400-3 are not included in the communication path table, and thereby a virtual multi-hop network not including these shaded devices can be configured.

As shown in FIG. 15, for the physical multi-hop network shown in FIG. 13, relay devices 300-5, 300-9 and 300-10, and child devices 400-3 to 400-5 are not included in the communication path table, and thereby a virtual multi-hop network not including these shaded devices can be configured.

In this way, the virtual multi-hop networks can be configured on a physical multi-hop network by not including predetermined devices in the communication path table.

As described above, in the present invention, communication path information is previously generated and distributed in the multi-hop network. Thereby, the burden on a routing process can be reduced. Moreover, the timing information is included in the communication path table and is distributed. Thereby, the packet collision and a retransmission process due to the packet collision can be reduced, and thus the multi-hop network system with low power consumption can be provided.

Generally, if an autonomous routing process is performed, a packet communication destination is found by propagating broadcast for path search around. Thereby, a broadcast packet is spread throughout the network. The present invention avoids this spreading of the broadcast packet, and does not perform unnecessary packet transmission. Thus, packet communication that consumes the most power can be reduced to communication that uses the minimum necessary amount power.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A multi-hop network system for performing multi-hop communication, the system comprising:
   a parent device that is connected to a highest level of said multi-hop network system;
   a child device that is connected to an end of said multi-hop network system;

a relay device that transfers packet data transmitted from said child device to said parent device; and a server that creates a communication path table indicating a communication path for the packet data, based on connection information reported by said parent device and said relay device, and distributes the created communication path table to said parent device, said relay device and said child device, wherein said parent device reports the connection information to said server, said child device transmits the packet data to a relay device indicated in the communication path table, based on the communication path table distributed by said server, and said relay device reports the connection information to said server, and transfers the packet data transmitted from said child device, to a relay device or a parent device indicated in the communication path table, based on the communication path table distributed by said server, wherein said server creates the communication path table so that a transmission timing, which is the timing when each of said child device and said relay device transmits the packet data, is included in the communication path table, said child device transmits the packet data at a timing depending on the transmission timing indicated in the communication path table, said relay device transmits the packet data at a timing depending on the transmission timing indicated in the communication path table, and the transmission timing when said child device transmits the packet data is different from the transmission timing when said relay device transmits the packet data.

2. The multi-hop network system according to claim 1, wherein
if there are communication paths from said child device to said parent device, said server creates the communication path table indicating the communication paths.

3. The multi-hop network system according to claim 1, wherein
when there is a new connection of a relay device or a child device, other than a relay device and a child device that are connected to said relay device, said relay device reports the connection information indicating the connection, to said server, and
said server updates the communication path table based on the reported connection information, and distributes the updated communication path table to said parent device, said relay device and said child device.

4. The multi-hop network system according to claim 1, wherein
if reception quality information indicating reception quality of the packet data in said parent device or said relay device is transmitted from said parent device or said relay device, said server assigns a priority to the communication path, based on the reception quality indicated by the reception quality information, and creates the communication path table including priority information indicating the priority,
said child device transmits the packet data based on the priority indicated by the priority information indicated in the communication path table, and
said relay device transfers the packet data based on the priority indicated by the priority information indicated in the communication path table.

5. The multi-hop network system according to claim 1, wherein the packet data is transmitted from the child device to the parent device via the relay device at a first packet transmission timing; and the packet data is transmitted from another child device to the parent device via the relay device at a second transmission timing which is different from the first transmission timing; and the packet data is transmitted from the relay device to the parent device at a third transmission timing which is different from both of the first and second transmission timings; and the packet data is transmitted from another relay device to the parent device at a fourth transmission timing which is different from each of the first, second and third transmission timings.

6. A server, comprising:
a path table creator that creates a communication path table indicating a communication path for packet data to be transmitted and received by communication devices included in a multi-hop network system that performs multi-hop communication, based on connection information reported by said communication devices; and
a path table distributor that distributes the communication path table created by said path table creator to said communication devices,
wherein said path table creator creates the communication path table so that a transmission timing, which is the timing when each of said communication devices transmits the packet data, is included in the communication path table,
each of said communication devices transmits the packet data at a respective timing depending on the corresponding transmission timing indicated in the communication path table, and
the respective timings when said communication devices transmit the packet data are different from each other.

7. The server according to claim 6, wherein the packet data is transmitted from a first communication device to a second communication device from among said communication devices at a first packet transmission timing; and the packet data is transmitted from another communication device, from among said communication devices, to the second communication device at a second transmission timing which is different from the first transmission timing.

8. A path notification method of notifying a communication path through which packet data is transmitted from a child device connected to an end of a multi-hop network system, to a parent device connected to a highest level of said multi-hop network system, via a relay device, the method comprising the processes of:
reporting connection information on said parent device to a server connected to said parent device, by said parent device;
reporting connection information on said relay device to said server by said relay device;
creating a communication path table indicating the communication path for the packet data, by said server, based on the connection information reported by said parent device and said relay device;
distributing the created communication path table to said parent device, said relay device and said child device by said server;
transmitting the packet data to a relay device indicated in the communication path table, by said child device, based on the communication path table distributed by said server; and
transferring the packet data transmitted from said child device, to a relay device or a parent device indicated in the communication path table, by said relay device, based on the communication path table distributed by said server, wherein the creating the communication path table comprises including a transmission timing when each of said child device and said relay device transmits the packet data into the communication path table, the transmitting the packet data by said child device comprises transmitting the packet data at a timing depending on the transmission timing indicated in the communication path table, the transferring the packet data by said relay device comprises transmitting the packet data at a timing depending on the transmission timing indicated in the communication path table, and the transmission timing when said child device transmits the packet data is different from the transmission timing when said relay device transmits the packet data.

9. The method according to claim 8, wherein the packet data is transmitted from the child device to the parent device via the relay device at a first packet transmission timing; and the packet data is transmitted from another child device to the parent device via the relay device at a second transmission timing which is different from the first transmission timing; and the packet data is transmitted from the relay device to the parent device at a third transmission timing which is different from both of the first and second transmission timings; and the packet data is transmitted from another relay device to the parent device at a fourth transmission timing which is different from each of the first, second and third transmission timings.

10. A multi-hop network system for performing multi-hop communication, the system comprising:
a parent device that is connected to a highest level of said multi-hop network system;
a child device that is connected to an end of said multi-hop network system;
a relay device that transfers packet data transmitted from said child device to said parent device; and
a server that creates a communication path table indicating a communication path for the packet data, based on connection information reported by said parent device and said relay device, and distributes the created communication path table to said parent device, said relay device and said child device,
wherein said parent device reports the connection information to said server,
said child device transmits the packet data to a relay device indicated in the communication path table, based on the communication path table distributed by said server, and said relay device reports the connection information to said server, and transfers the packet data transmitted from said child device, to a relay device or a parent device indicated in the communication path table, based on the communication path table distributed by said server,
wherein only when communication through all communication paths indicated in the communication path table is disabled, said relay device uses an autonomous routing function to continue the communication, and reports the connection information obtained by using the autonomous routing function, to said server, and
said server updates the communication path table based on the reported connection information, and distributes the updated communication path table to said parent device, said relay device and said child device.

11. A server, comprising:
a path table creator that creates a communication path table indicating a communication path for packet data to be transmitted and received by communication devices included in a multi-hop network system that performs multi-hop communication, based on connection information reported by said communication devices; and
a path table distributor that distributes the communication path table created by said path table creator to said communication devices,
wherein only when communication through all communication paths indicated in the communication path table is disabled, a relay device from among said communication devices uses an autonomous routing function to continue the communication, and reports the connection information obtained by using the autonomous routing function, to said server, and
said server updates the communication path table based on the reported connection information, and distributes the updated communication path table to said communication devices.

12. A path notification method of notifying a communication path through which packet data is transmitted from a child device connected to an end of a multi-hop network system, to a parent device connected to a highest level of said multi-hop network system, via a relay device, the method comprising the processes of:
reporting connection information on said parent device to a server connected to said parent device, by said parent device;
reporting connection information on said relay device to said server by said relay device;
creating a communication path table indicating the communication path for the packet data, by said server, based on the connection information reported by said parent device and said relay device;
distributing the created communication path table to said parent device, said relay device and said child device by said server;
transmitting the packet data to a relay device indicated in the communication path table, by said child device, based on the communication path table distributed by said server; and
transferring the packet data transmitted from said child device, to a relay device or a parent device indicated in the communication path table, by said relay device, based on the communication path table distributed by said server,
wherein only when communication through all communication paths indicated in the communication path table is disabled, said relay device uses an autonomous routing function to continue the communication, and reports the connection information obtained by using the autonomous routing function, to said server, and
said server updates the communication path table based on the reported connection information, and distributes the updated communication path table to said parent device, said relay device and said child device.

* * * * *